Patented Aug. 14, 1934

1,970,163

UNITED STATES PATENT OFFICE 1,970,163

ART OF TREATING SEEDS

Ernst Brandus, Berlin, Germany, assignor to N. V. Noord-West Orion Handel Maatschappij, Amsterdam, Netherlands No Drawing. Application January 30, 1931, Serial No. 512,510. In Germany February 4, 1930

5 Claims. (Cl. 167—38)

My present invention while capable of a broad range of utility, is especially concerned with the treatment of seeds so that the seeds when planted, are protected against the attacks of insects, parasites and various plant diseases and also safeguarded against consumption by birds or rodents.

Prior to the present invention, the methods of seed treatment for more or less analogous purposes, i. e. with fungicidal or insecticidal material, have been either wet or dry methods. By the dry method, a pulverulent material has been strewn upon the seeds prior to planting and after the seeds have been planted, the moisture in the soil acting upon the powder, effects the desired seed treatment. This dry method has certain inherent disadvantages such as the presence of poisonous dust in the air when the seeds are being originally powdered and the failure of the dry material to adhere satisfactorily to the seeds.

The wet treatment is performed by dipping the seeds in a treating liquid and then drying them. By this method, the seeds receive a secondary treatment when they are planted due to the fact that the moisture in the ground again renders the treating agent active.

The wet method, however, also presents difficulties, since the seeds when immersed in a treating liquid, are not only subject to swelling but if they become too wet they often sprout prematurely. Attempts to prevent these conditions by regulating the drying operation after the seeds have been immersed in the treating liquid, have resulted in drying processes which are complicated and time consuming and at best, not entirely satisfactory.

In accordance with the present invention, I eliminate the disadvantages of both the wet and dry methods and utilize a treating method which combines the advantages of both, that is to say, a method in which there is no problem of dust in the air or the treating medium falling off the seeds and in which there is no difficult problem of preventing swelling or germination of the seeds after treatment and before planting. In accordance with the invention, the seed treating media such as insecticides or fungicides or material repellent to rodents and birds, are worked up into a foam by the combination with these agents, of some foam forming medium. Preferably this foam is well developed, that is to say, the volume of the foamy mixture as compared to the volume of liquid used in forming it, may be twenty to one or even higher.

I do not wish to be limited either to the use of any special agent as an insecticide or fungicide or to the use of any special foam forming medium, since the invention in its broader concepts, involves the treatment of seeds with any foamy substance capable of effecting a substantial deposit on the seeds without unduly wetting them. As a matter of fact, the foam treatment is not limited to the applications of fungicidal or insecticidal ingredients, but may be conveniently used for treating the seeds with a magnetizable material prior to magnetically sorting the seeds. It is also within the scope of the invention to treat other materials with active foamy masses. For instance, wood may be impregnated against the attacks of teredoes or borers.

The invention will be described, however, with particular reference to the treatment of seeds in a manner which will protect them against attacks by insects and parasites. A typical mixture consists of mercury or copper or arsenic with some foam forming material such as saponic substances glues, gelatins or plant ooze. These materials mixed with a proper amount of water, may be beaten or worked into a foam in any desired manner. Anything from pure mechanical agitation to chemical reaction and gas liberation or generation may be utilized in the production of the foam itself. The seeds are treated in the foam by the ordinary process of immersing them and thoroughly mixing them therein and when the seeds are removed, the foam will quickly dry, leaving the desired deposit on the surfaces of the seeds. When the seeds are planted, the moisture of the earth will effect a secondary treatment as is the case with the conventional wet process, yet the disadvantages of the wet process, such as the possibility of premature sprouting or swelling together with the need for time consuming and special drying operations, are completely avoided.

I have found that exceptionally good results may be obtained by mixing with water a substance which contains in combination, an insecticide and a foam forming ingredient, such as albumen or albumen like materials. The following mercury combinations have been found especially advantageous for the purpose, mercury chlorid gluten, mercury peptonate, mercury albuminate. A typical example of the use of one of these substances is as follows:—

One part by weight of mercury chlorid gluten is mixed with fifty parts by weight of water and is beaten or agitated to work the mass up into a foam. This will produce a small bubble foam which has about five or six times the water used, small bubbles being particularly desirable for the treating medium to the seeds. The treatment of the seeds in a foamy substance results among other things, in a material saving in the amount of treating medium utilized.

It will of course, be apparent that it is within the scope of the invention either to develop the foam as suggested above or to form a natural foam of any suitable material and subsequently introduce and admix the treating agents with the foam.

I claim:

1. A method of treating seeds which consists in mixing a foam forming material and a sufficient amount of liquid to form a foam with an insecticidal substance, covering the seeds with said mixture to coat the same with said substance and then drying the seeds before they become wet enough to swell or sprout.

2. A method of treating seeds which consists in forming a bath containing approximately one part by weight of mercury chlorid gluten and fifty parts by weight of water to form a foaming mixture, covering the seeds with said mixture to form a coating thereon without moistening the seeds except on the surface thereof and then drying the said seeds.

3. A method of treating seeds which consists in mixing a small quantity of mercury chlorid gluten, with a relatively large part of water to form a bath, immersing said seeds in said bath to cover the same with a film of the mixture and drying said seeds so that they retain a coating thereon without moistening the seeds except on the outside of same.

4. A method of treating seeds which consists in forming a bath containing a small quantity of mercury peptonate and a relatively large quantity of water, mixing said materials, causing said bath to become foamy, immersing the seeds in said bath to coat the same without moistening the seeds except on the outer surface and then removing and drying said seeds.

5. A method of treating seeds which consists in mixing a small quantity of mercury albuminate and a relatively large quantity of water, causing said bath to become foamy, immersing the seeds therein to coat the seeds without moistening them other than on the surface thereof and then removing and drying the seeds.

ERNST BRANDUS.